Aug. 14, 1951            C. O. CHRISTENSEN           2,563,919
CONTAINER TRUCK WITH SELECTIVE GROUND
ENGAGING AUXILIARY WHEELS
Filed June 16, 1947
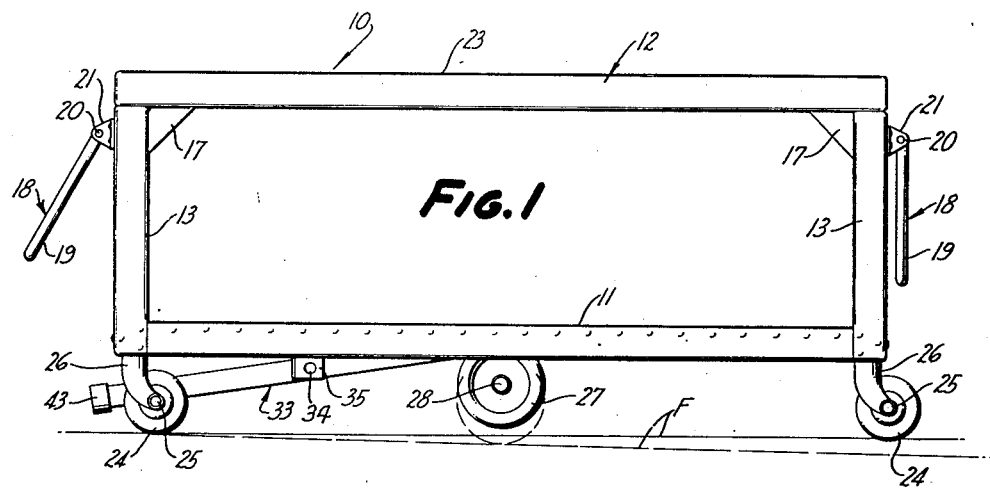
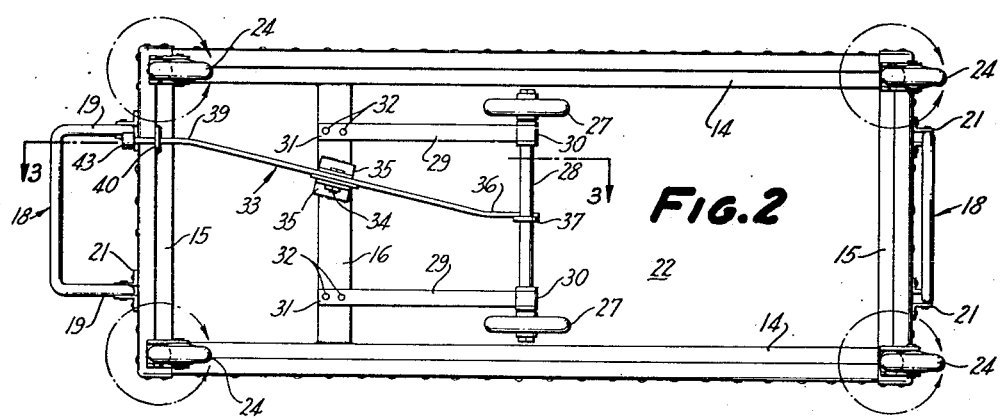
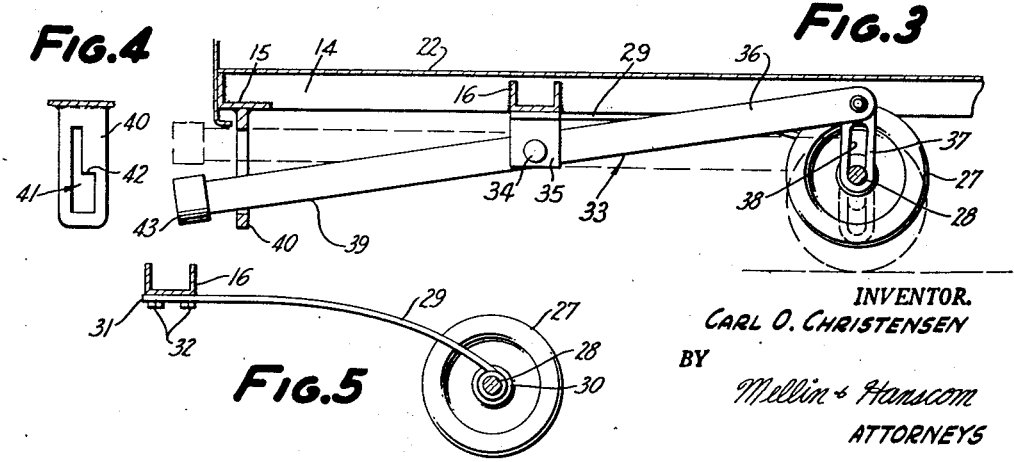
INVENTOR.
CARL O. CHRISTENSEN
BY
    Mellin & Hanscom
            ATTORNEYS

UNITED STATES PATENT OFFICE 2,563,919

CONTAINER TRUCK WITH SELECTIVE GROUND ENGAGING AUXILIARY WHEELS

Carl O. Christensen, Walnut Creek, Calif., assignor to Roll-Rite Corporation, Oakland, Calif., a corporation of California Application June 16, 1947, Serial No. 754,919

4 Claims. (Cl. 280—49)

The present invention pertains to vehicles, and more particularly to vehicles for conveying articles or materials in department stores, factories and similar establishments.

An object of the present invention is to provide a vehicle of the character indicated having a much smaller turning radius than heretofore obtainable.

A further object of the invention is to provide a vehicle which can be propelled easily in a predetermined straight line path despite the presence of caster wheels on the vehicle.

Yet a further object of the invention resides in the provision of a vehicle having a plurality of wheels selectively engageable with the floor or ground to provide a rolling support for the vehicle either at its forward and rearward ends or at one end and intermediate such ends.

Another object of the invention is to provide a vehicle having supporting wheels at its ends and wheels intermediate its ends which are selectively engageable with or retractable from the floor or ground to support the vehicle either at one end and intermediate its ends or at both of its ends.

Still another object of the invention is to provide a vehicle having caster wheels at its ends and non-swiveling wheels intermediate its ends which are selectively engageable with or disengageable from the floor or ground to effect corresponding disengagement or engagement of the caster wheels at one end of the vehicle from or with the floor or ground.

One form which the invention may assume is exemplified in the following description and illustrated by way of example in the accompanying drawings in which:

Fig. 1 is a side elevation of a vehicle.

Fig. 2 is a plan view of the vehicle as seen from the bottom thereof in Fig. 1.

Fig. 3 is a longitudinal section on an enlarged scale taken along the line 3—3 of Fig. 2.

Fig. 4 is an end elevation of the holding plate for the intermediate vehicle wheels.

Fig. 5 is a partial section and elevation of one of the spring mountings for the intermediate wheels.

The invention is disclosed in the drawings as applied to a vehicle for handling articles or materials in a department store, factory or similar establishment. Such vehicle includes a frame 10 which may be constructed in any suitable manner. In the example of the invention shown in the drawings, such frame includes a base portion 11, a top 12 and intermediate upright supports 13 securing the two portions together rigidly in spaced relation. The base may be formed from a pair of side angle-iron members 14 of any suitable materials, such as aluminum or steel, which are riveted, welded or otherwise suitably secured to the ends of lower transverse end members 15. An intermediate channel shaped cross member 16 may extend between and be secured to the longitudinal side frame members 14 in any suitable manner, as by welding.

The lower ends of the four vertical uprights 13 are secured to the corners of the base in any suitable manner, as by riveting, and such uprights are attached to the top frame 12, which may be fabricated in substantially the same manner as the base, by riveting, welding or the like. Diagonal braces 17 in the form of gusset plates may also be riveted to the ends of the top frame member 12 and uprights 13 in order to assure rigidity in the entire structure.

The vehicle may be pushed along the ground, or it may be pulled, depending on the choice of the operator. Pulling may be facilitated through the provision of a generally U-shaped handle 18 at each end of the vehicle whose arms 19 are pivotally mounted on pins 20 extending between and secured to the ears of opposed angle brackets 21 attached to the ends of the vehicle. The base 11 of the vehicle may have an aluminum floor or panel 22 attached thereto to provide a relatively large area for the stacking or arrangement of articles or materials, and a top or table 23 may be secured across the upper frame portion of the vehicle. As indicated above, the entire frame structure may be made of suitable material, and, if lightness is desired, such material may be of aluminum or magnesium.

The vehicle is provided with a caster wheel 24 at each end, preferably at each end near the corners of the frame, each wheel being rotatably mounted on a horizontal axle 25 supported in a generally U-shaped bracket 26 which is swiveled within the frame of the vehicle device. Since the horizontal axle 25 of the wheel 24 is offset from the axis of swiveling of the bracket 26, a caster mounting is provided for each wheel at each corner of the frame. The axes of these wheels 24 all lie in substantially the same plane, the wheels being adapted to engage the floor or ground on which the vehicle may rest simultaneously.

The vehicle may be pushed or pulled along the floor or ground, but, in view of the caster wheel mountings, it may tend to deviate readily from its intended path of movement upon slight deviation in the direction of propulsion force applied to the vehicle frame. Moreover, such vehicles supported by caster wheels at both ends are difficult to control in turning corners, particularly where narrow aisles are encountered, as in department stores or factories.

For the purpose of making it easier to convey the vehicle along the ground, and also to permit its turning with facility in a much smaller radius, the present invention provides a pair of wheels 27 intermediate the ends of the vehicle. Such wheels are preferably located midway between the caster wheels 24, being rotatably mounted on the ends of a transverse axle 28 whose ends terminate immediately inwardly of the side frame members 14 of the base.

The axle is connected to a pair of laterally spaced leaf springs 29 whose inner ends 30 are coiled around the axle adjacent the wheels 27, such springs extending longitudinally of the vehicle and having their outer ends 31 rigidly secured to the intermediate cross member 16 in any suitable manner, as by the use of bolts or cap screws 32 extending into the base of the channel 16. The springs 29 are curved from the channel support in a downward direction toward the central portion of the vehicle, in effect providing cantilever leaf spring supports for the intermediate vehicle wheels 27, tending to inherently swing the axle 28 and such wheels downwardly into engagement with the floor or ground F.

The ability of the wheels 27 to engage the floor or ground is determined by an operating lever 33, which is pivotally mounted upon a fulcrum bolt or pin 34 extending through the depending ears of opposed brackets 35 welded or otherwise secured to the cross member 16. This lever may be specifically formed with its intermediate portion inclined to the cross member 16 and with its inner end 36 substantially at right angles to the axle 28 above which it is pinned to a depending link 37 having a vertical slot 38 through which the axle extends. The outer arm 39 of the operating lever extends through a holder plate 40 welded to the end frame member 15 and having a generally L-shaped vertical slot 41 provided with an intermediate shoulder 42 designed to engage the upper surface of the outer lever arm 39. A suitable pedal plate 43 is secured to the outer arm outwardly of the holder plate 40 and vehicle frame.

The parts are so arranged that when the outer end 39 of the lever 33 is in elevated position, permitted by its entry into the long leg of the slot 41 in the holder plate 40, its inner end 36 is depressed to move the slotted link 37 downwardly, which permits the leaf springs 29 to move the axle 28 and intermediate wheels 27 into engagement with the floor F, the spring force being sufficient to raise one end of the vehicle and its attached caster wheels 24 off the floor. The vehicle may then be rolled along the floor without fear of inadvertent deviation from its intended path of movement, in view of the tendency of the intermediate wheels 27 to each continue rolling in the same plane. When it is desired to move around corners, all that need be done is to provide a lateral force to the vehicle and the entire vehicle will pivot about the point of engagement of one wheel 27 with the floor or ground, swinging around the corner and making the desired extent of turn very readily and in a comparatively small turning radius.

During conveying of the vehicle along the floor, the intermediate wheels 27, which are supporting the major portion of the load on the vehicle, in view of their intermediate location and the lack of contact of one pair of end caster wheels 24 with the floor, provide a resilient mounting and improve the riding ability of the vehicle along the floor. The axle 28 may move vertically freely within the slotted link 37 when the wheels 27 engage the floor since the link is then located in a downward position with the ends of the slot 38 spaced from the axle, as illustrated in dotted lines in Fig. 3.

When it is desired to stop the vehicle and allow it to remain in any one position, as during loading and unloading of articles thereon, the pedal 43 may be depressed and the outer arm 39 swung laterally until it is disposed under the holder plate shoulder 42, whereupon such depression force may be removed, allowing the upper surface of the outer arm to contact the shoulder 42 and prevent the springs 29 from re-elevating the outer arm. Such depression of the outer arm 39 moves the inner lever arm 36 upwardly and causes the lower end of the slotted link 37 to engage the axle 28 and elevate it and its wheels 27 against the force of the springs 29, to remove the wheels 27 from engagement with the floor. This retraction of the intermediate wheels allows the four caster wheels 24 at the corners of the vehicle to engage the floor F and support the entire load.

When it is again desired to roll the vehicle along the floor, the pedal 43 may again be depressed slightly and the outer arm 39 forced laterally to place it in alignment with the long leg of the slot 41, which permits the outer arm 39 to move upwardly within this leg and the inner arm 36 downwardly under the action of the leaf springs 29, which again engage the intermediate wheels with the floor, and allow the caster wheels 24 at one end of the vehicle to be elevated from the floor. The retracted condition of the intermediate wheels and the engagement of the caster wheels with the floor F are shown in full line in Fig. 1, while the engagement of the intermediate wheels with the floor and the elevation of the caster wheels at one end therefrom are illustrated in broken lines in Fig. 1.

It is, accordingly, apparent that a vehicle has been provided, particularly adapted for use in department stores, factories and similar establishments, which provides a support at each corner during loading and unloading of the vehicle, holding the frame 10 in a horizontal position, and that engagement of the intermediate wheels 27 with the floor elevates one end of the vehicle to assure the rolling of the vehicle along its intended path and the turning of such vehicle, if desired, with a comparatively small turning radius. The vehicle is readily converted from one condition to another through the simple manipulation of the lever arm 33, which determines the ability of the leaf springs 29 to function or to be prevented from functioning.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A vehicle, including a frame having ground engageable wheels at its ends, an axle arranged transversely of said frame between its ends, intermediate ground engageable wheels mounted on said axle for rotation about a common transverse axis, spring means connected to said axle and frame for enabling said intermediate wheels to support said frame when engaged with the ground, a lever pivotally mounted on said frame, a link connected to said lever and having a slot through which said axle extends, said lever having an outer arm adapted to be depressed to cause said link to elevate said axle and said intermediate wheels from the ground against the force of said spring means.

2. A vehicle, including a frame having ground engageable wheels at its ends, an axle arranged transversely of said frame between its ends, intermediate ground engageable wheels mounted on said axle for rotation about a common transverse axis, leaf springs connected to said axle and to said frame for urging said intermediate wheels into engagement with the ground whereby said leaf springs sustain at least part of the load of said frame, a lever pivotally mounted on said frame, a link connected to said lever and having a slot through which said axle extends, said lever having an outer arm adapted to be depressed to cause said link to elevate said axle and said intermediate wheels from the ground against the force of said leaf springs, and means secured to said frame for holding said outer arm in its depressed position.

3. A vehicle, including a frame having longitudinally extending side members and transverse end members secured to said side members, a cross member secured to said side members between said end members, a ground engageable wheel at each corner of said frame, an axle arranged transversely of said frame between its side members, intermediate ground engageable wheels mounted on said axle adjacent said side members for rotation about a common transverse axis, longitudinally extending leaf springs each having one end secured to said cross member and its other end secured to said axle for urging said axle downwardly and said intermediate wheels into engagement with the ground, a lever pivotally mounted on said cross member, a link connected to said lever and having a vertical slot through which said axle extends, said lever having an outer arm adapted to be depressed to cause said link to elevate said axle and said intermediate wheels from the ground against the force of said leaf springs, and means secured to said frame for holding said outer arm in its depressed position.

4. A vehicle as defined in claim 3, wherein said leaf springs are adapted to engage said intermediate wheels with sufficient force to lift the wheels at one end of said frame from the ground.

CARL O. CHRISTENSEN.

REFERENCES CITED

The following references are of record in the file of this patent:

UNITED STATES PATENTS

| Number | Name | Date |
|---|---|---|
| 687,957 | Fortner | Dec. 3, 1901 |
| 721,610 | Scott | Feb. 24, 1903 |
| 1,241,355 | Donnell | Sept. 25, 1917 |
| 1,738,548 | White | Dec. 10, 1929 |
| 1,745,258 | Hallowell | Jan. 28, 1930 |
| 1,911,924 | Powers | May 30, 1933 |

FOREIGN PATENTS

| Number | Country | Date |
|---|---|---|
| 117,178 | Great Britain | July 11, 1918 |